(12) United States Patent
Garza et al.

(10) Patent No.: US 8,572,187 B2
(45) Date of Patent: Oct. 29, 2013

(54) AUTOMATED DUPLICATE MESSAGE CONTENT DETECTION

(75) Inventors: Jose Emir Garza, Surrey (GB); Stephen James Hobson, Middlesex (GB)

(73) Assignee: International Business Machines Corporation, Armonk, NY (US)

( * ) Notice: Subject to any disclaimer, the term of this patent is extended or adjusted under 35 U.S.C. 154(b) by 728 days.

(21) Appl. No.: 12/430,182

(22) Filed: Apr. 27, 2009

(65) Prior Publication Data

US 2010/0274857 A1    Oct. 28, 2010

(51) Int. Cl.
*G06F 15/82* (2006.01)
*G06F 11/10* (2006.01)

(52) U.S. Cl.
USPC .............. 709/206; 714/807; 714/E11.04

(58) Field of Classification Search
USPC .............. 709/206; 714/807, E11.04
See application file for complete search history.

(56) References Cited

U.S. PATENT DOCUMENTS

| | | | | |
|---|---|---|---|---|
| 5,856,972 A * | 1/1999 | Riley et al. | | 370/389 |
| 7,080,123 B2 * | 7/2006 | Freed | | 709/206 |
| 7,373,424 B2 * | 5/2008 | Surma et al. | | 709/238 |
| 7,694,204 B2 * | 4/2010 | Schmidt et al. | | 714/758 |
| 2002/0039370 A1 * | 4/2002 | Elliot | | 370/503 |
| 2004/0148344 A1 * | 7/2004 | Navar et al. | | 709/203 |
| 2005/0190797 A1 * | 9/2005 | Elliot | | 370/503 |
| 2009/0199064 A1 * | 8/2009 | Radha et al. | | 714/752 |
| 2010/0153511 A1 * | 6/2010 | Lin | | 709/207 |
| 2010/0333111 A1 * | 12/2010 | Kothamasu et al. | | 719/313 |

FOREIGN PATENT DOCUMENTS

EP    1732285 A1 * 12/2006
WO    WO 2008018690 A1 * 2/2008

OTHER PUBLICATIONS

Cui et al., An Approach for the Corruption-aware Protocols to Work over Link Layer CRC Mechanisms., Wireless Communications, Networking and Mobile Computing, 2008. WiCOM '08. 4th International Conference on , vol., No., pp. 1,4, Oct. 12-14, 2008.*

Kim et al., Improving the Performance of Multi-hop Wireless Networks using Frame Aggregation and Broadcast for TCP ACKs., Proceeding CoNEXT '08 Proceedings of the 2008 ACM CoNEXT Conference., Article No. 27., ACM New York, NY, USA Dec. 2008.*

* cited by examiner

*Primary Examiner* — Wing F Chan
*Assistant Examiner* — Kostas Katsikis
(74) *Attorney, Agent, or Firm* — Lee Law, PLLC; Christopher B. Lee (57) ABSTRACT

Message content associated with at least one message received by a message processing server is stored in association with the message processing server. The message content within an incoming message is compared with the stored message content. A determination is made as to whether the stored message content is duplicated by the message content associated with the incoming message. A duplicate message content management action is performed based upon the determination as to whether the stored message content is duplicated by the message content associated with the incoming message. This abstract is not to be considered limiting, since other embodiments may deviate from the features described in this abstract.

19 Claims, 4 Drawing Sheets

AUTOMATED DUPLICATE MESSAGE CONTENT DETECTION

BACKGROUND OF THE INVENTION

1. Field of the Invention

The present invention relates to systems and methods for detecting duplication of message payloads within networked systems. More particularly, the present invention relates to automated duplicate message content detection.

2. Related Art

Application layer messages are typically communicated within networked systems by encapsulating message content associated with the application layer messages within a wrapper, such as a data packet. A data packet may have a header and other overhead information associated with message routing and processing by network layers other than the application layer that either generates or processes the encapsulated message content. The message content may be divided into multiple data packets/messages for transmission. The message content portion of a particular message or packet is often referred to as a "payload" of the respective message or packet. Messages may be distinguished at the network layers by differences in their header and other overhead information, such as message sequence numbers and other characteristics. The message sequence numbers and other characteristics are designed to allow acknowledgements of data packet communication between various nodes within a given network system and to guarantee delivery of each data packet.

BRIEF SUMMARY OF THE INVENTION

The subject matter described herein provides automated duplicate message content detection to determine whether message content (e.g., payload) is duplicated within subsequent messages (e.g., data packets). Conventional message processing, while guaranteeing delivery of each message transmitted, does not manage situations where an application-layer process resends the same message content more than once. For example, a user of a web browser at a computing device may lose patience waiting for a response to a request message sent to a server by the computing device and may cause the computing device to resend the request message to the server. Unnecessary processing and communication bandwidth may be consumed when the server processes and responds to the same request message twice. The present subject matter determines whether message content is duplicated within different messages by storing message content associated with a message received by a message processing server. Message content within a subsequent incoming message is compared with the stored message content. A duplicate message content management action is performed based upon the determination as to whether the stored message content is duplicated by the message content associated with the incoming message.

A method includes storing, in association with a message processing server, message content associated with at least one message received by the message processing server; comparing the message content within at least one incoming message with the stored message content; determining whether the stored message content is duplicated by the message content associated with the at least one incoming message; and performing a duplicate message content management action based upon the determination as to whether the stored message content is duplicated by the message content associated with the at least one incoming message.

A system includes a memory; and a processor programmed to: store, in association with a message processing server, message content associated with at least one message received by the message processing server in the memory; compare the message content within at least one incoming message with the stored message content; determine whether the stored message content is duplicated by the message content associated with the at least one incoming message; and perform a duplicate message content management action based upon the determination as to whether the stored message content is duplicated by the message content associated with the at least one incoming message.

An alternative system includes a memory; and a processor programmed to: calculate a message content integrity value comprising at least one of a checksum value and a cyclical redundancy check (CRC) value based upon message content associated with the at least one message received by a message processing server; time stamp the message content associated with the at least one received message with an arrival time; store the arrival time with the message content associated with the at least one received message in the memory at a location referenced by the message content integrity value; identify a message content payload area associated with the at least one incoming message; compare data within the message content payload area associated with the at least one incoming message with the stored message content; determine whether a specific data pattern associated with the stored message content is duplicated by the message content associated with the at least one incoming message; in response to a determination that the at least one incoming message comprises duplicated message content, at least one of: discard at least one of the at least one incoming message and the stored message content; and report that the stored message content is duplicated by the message content associated with the at least one incoming message; and in response to a determination that the at least one incoming message does not comprise duplicated message content, at least one of: process the message content within the at least one incoming message; and forward the at least one incoming message to another device; and discard the stored message content upon expiration of a configured expiration event for storage of message content if the stored message content has not been discarded in response to a determination that the at least one incoming message comprises duplicated message content.

A computer program product includes a computer useable storage medium including a computer readable program. The computer readable program when executed on a computer causes the computer to: store, in association with a message processing server, message content associated with at least one message received by the message processing server in a memory; compare the message content within at least one incoming message with the stored message content; determine whether the stored message content is duplicated by the message content associated with the at least one incoming message; and perform a duplicate message content management action based upon the determination as to whether the stored message content is duplicated by the message content associated with the at least one incoming message.

Those skilled in the art will appreciate the scope of the present invention and realize additional aspects thereof after reading the following detailed description of the preferred embodiments in association with the accompanying drawing figures.

BRIEF DESCRIPTION OF THE SEVERAL VIEWS OF THE DRAWINGS

The accompanying drawing figures incorporated in and forming a part of this specification illustrate several aspects of the invention, and together with the description serve to explain the principles of the invention.

DETAILED DESCRIPTION OF THE INVENTION

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides automated duplicate message content detection to determine whether message content (e.g., payload) is duplicated within subsequent messages (e.g., data packets). Conventional message processing, while guaranteeing delivery of each message transmitted, does not manage situations where an application-layer process resends the same message content more than once. For example, a user of a web browser at a computing device may lose patience waiting for a response to a request message sent to a server by the computing device and may cause the computing device to resend the request message to the server. Unnecessary processing and communication bandwidth may be consumed when the server processes and responds to the same request message twice. The present subject matter determines whether message content is duplicated within different messages by storing message content associated with a message received by a message processing server. Message content within a subsequent incoming message is compared with the stored message content. A duplicate message content management action is performed based upon the determination as to whether the stored message content is duplicated by the message content associated with the incoming message.

The message content may include any form of data that may be communicated via messaging between devices. For example, the message content may include a portion of a set of data and a portion of a document. Data may be text data, tabular data, indexed data, or may be other data with any type of organization. A document may be a text document, a formatted text document (e.g., a word processing document), an extensible markup language (XML) document, an extensible stylesheet language transformation (XSLT) document, or any other form of document.

Furthering the example above, a message with an XML message body may be transformed by a receiving device using XSLT encoded with rules for transforming the XML document. If certain elements of data within a set of elements associated with an XML document are determined to be "relevant" for identification of duplicate message content, an XSLT-encoded transformation may be created that takes each message and constructs a new piece of XML message content that contains only the relevant elements. Additionally, the transformed message, including the relevant elements, may be the message content that is stored and used to compare with incoming messages to detect duplicate message content within subsequent messages. Accordingly, use of XSLT encoding provides another example implementation that allows the present subject matter to be utilized for deployment of applications, such as web appliances. Within this context, a user may provide a message processing device, such as a server, with a set of rules, within one example encoded within the XSLT format, where the rules extract data to be compared without requiring the user to write code to implement a duplicate data comparison. The XSLT-encoded transformation may be distributed and updated using the present subject matter to identify a specific message content field that indicates a distributed or updated XSLT-encoded transformation.

One possible configuration interface for deployment of automated duplicate message content detection may include a dialog box with options for encoding certain fields or portions of a message. For ease of illustration purposes, the following Example 1 identifies one possible set of selections within such a user interface. It is understood that many possible user interfaces may be constructed based upon the present subject matter and all are considered within the scope of the present subject matter.

| User Interface Choice | User Input Requested |
| --- | --- |
| Entire message | Selection via checkbox or radio button |
| Message payload only | Selection via checkbox or radio button |
| Data at offset [ ____ ] and length [ ____ ] | Text field entry of offset within a message and a length |
| Data selected by XPath [ ____ ] | Text field entry for XPath |
| Data extracted by XSLT, filename [ ____ ] | Text field entry for filename |

EXAMPLE 1

User Interface Selection Examples for Automated Duplicate Message Content Detection Based upon the Example 1 above, the option that requests an offset and a length applies to a fixed format message situation. Within this situation, an offset may be configured to identify a data portion for use in comparison for duplicate message content detection. However, a pointer or other approach may also be used to identify a data portion for use in comparison for duplicate message content detection. The options for XPath and XSLT input may be used for payloads in XML format. However, based upon this example, standardized parameters may be developed and used for other formats, such as comma-separated lists or other forms of formatted data. As such, any such parameter-based duplicate message content detection is considered within the scope of the present subject matter Message content may also be identified within a given message or data packet based upon header or other information associated with the given message or data packet. Additionally, for a message including at least a portion of an XML document or an XSLT document, message content may be identified within a message content payload area within an incoming message by using a pointer that references the data portion of the incoming message.

Many other forms of message content exist. Additionally, many approaches to identifying a payload area of a message that includes message content exist. Accordingly, any and all forms of message content and approaches to identifying a payload area of a message are considered within the scope of the present subject matter.

In association with the automated duplicate message content detection described herein, received message content is stored. Storage of received message content may be performed by calculating a message content integrity value based upon the message content associated with a received message. The message content integrity value may include a calculated checksum value, a calculated cyclical redundancy check (CRC) value, or any other form of message content integrity value. The message content associated with the received message may then be stored in a memory, such as a cache memory, at a location referenced or indexed by the calculated message content integrity value.

Determining whether message content is duplicated within subsequent messages may include determining whether an entire message payload area is duplicated (e.g., identical). Determining whether message content is duplicated within subsequent messages may also include determining whether a specific data pattern is present within the stored message content and within the message content associated with an incoming message or portion of an incoming message. Continuing with the XSLT example above, rules may be constructed to manipulate message content upon extraction of the message content from an incoming message. In such a situation, a repeating pattern may be identified by a comparison rule encoded within the XSLT. Many other options exist for determining whether message content within multiple messages is duplicated and all are considered within the scope of the present subject matter.

A duplicate message content management action performed based upon a determination of whether the stored message content is duplicated within a subsequent incoming message may include discarding either the incoming message or the stored message content in response to a determination that the incoming message includes duplicated message content. The duplicate message content management action may also include processing the message content within the incoming message or forwarding (e.g., routing or re-routing) the incoming message to another device in response to a determination that the incoming message does or does not include duplicated message content. For example, a message that includes duplicated content may be forwarded to an administrative server for analysis and processing. The duplicate message content management action may also include reporting that the stored message content is duplicated by the message content associated with an incoming message. Many other options exist for performing management actions based upon determinations of duplicated message content and all are considered within the scope of the present subject matter.

A duplicate message content management action may be configured and performed based upon an established duplicate content management protocol that controls processing of messages received that include duplicated message content and that controls storage processing associated with stored message content. Additionally, a message content duplication protection duration may be configured based upon message content type or other forms of message characteristics. The message content duplication protection duration may be configured statically or dynamically based upon available storage, network traffic, network bandwidth, or other factors.

For example, stored message content may be discarded upon expiration of a configured expiration event. The configured expiration event may be based upon a variety of message content processing directives. For example, message content may be time stamped with an arrival time in association with receipt of a message and/or an expiration event may be configured for the message content. The message content may be stored with the time stamp and/or the expiration event configuration. The stored message content may be discarded upon expiration of a configured expiration event for storage of message content. As such, message content may be discarded based upon an expiration of a fixed storage time, arrival of a fixed number of intervening messages, expiration of a message inter-arrival time longer than a configured message inter-arrival storage interval, storage of message content in excess of a configured storage capacity limitation threshold, expiration of a configured message duplication protection duration, a least recently matched (LRM) message content storage strategy, and a determination that the stored message content is duplicated by the message content associated with the at least one incoming message. Many other possibilities exist for storage management and all are considered within the scope of the present subject matter.

The configured message inter-arrival storage interval may be based upon a specified inter-arrival time for subsequent incoming messages with duplicated message content. The LRM message content storage strategy may include processing to discard the oldest stored message content that has not been matched with duplicated message content after a configured time period or after the occurrence of some other configured expiration event.

Any of the expiration events may be statically or dynamically configured. Further, any of the expiration events may be provisioned or specified by a user of a device via a user interface or other control interface associated with the respective device. Many other options are available for configuring expiration events for storage of message content and all are considered to be within the scope of the present subject matter.

The automated duplicate message content detection described herein may be performed in real time to allow prompt detection of duplicated message content within multiple received messages. For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

Figure 1:
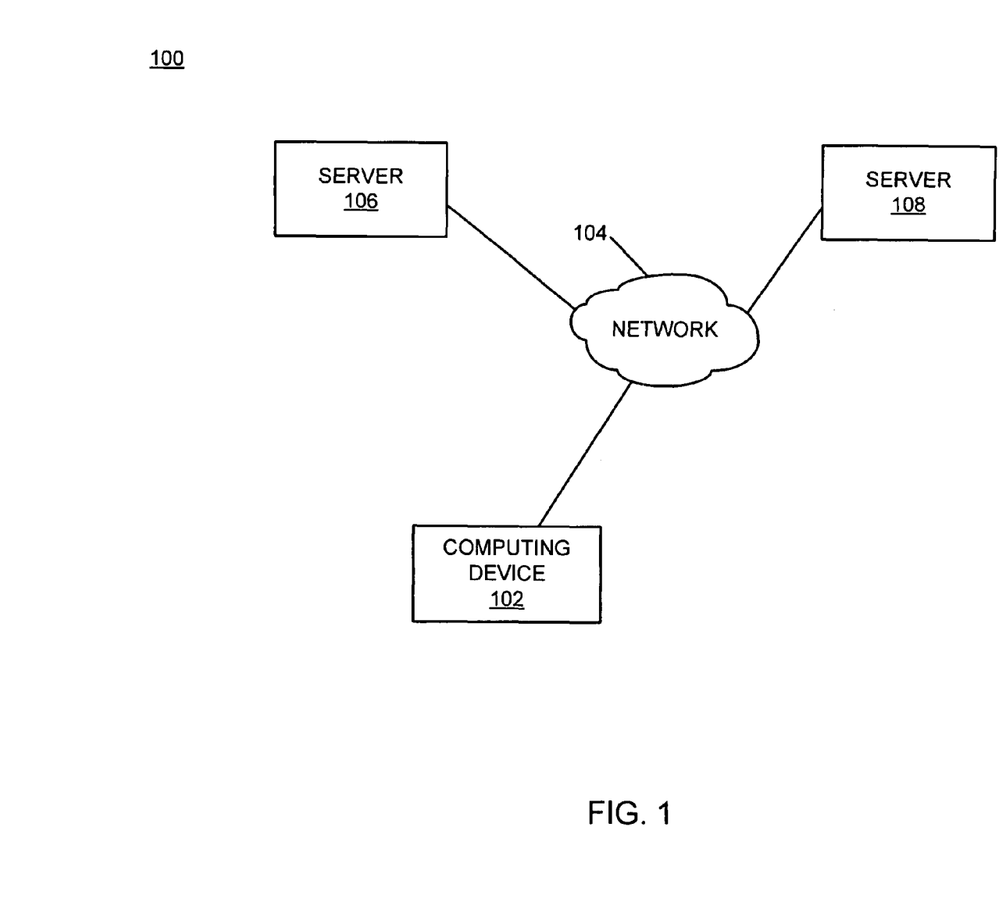
FIG. 1 is a block diagram of an example of an implementation of a system for automated duplicate message content detection according to an embodiment of the present subject matter.

FIG. 1 is a block diagram of an example of an implementation of a system 100 for automated duplicate message content detection. Within the system 100, a computing device 102 interconnects via a network 104 to a message processing server 106. The computing device 102 and the message processing server 106 also interconnect via the network 104 to a web server 108.

As will be described in more detail below in association with FIG. 2 through FIG. 4, the message processing server 106 provides automated duplicate message content detection based upon storage of message content associated with messages received by the message processing server 106 and comparison of the stored message content with message content associated with subsequent incoming messages.

It should be noted that the computing device 102 may be a portable computing device, either by a user's ability to move the computing device 102 to different locations or by the computing device 102's association with a portable platform, such as a plane, train, automobile, or other moving vehicle. It should also be noted that the computing device 102 may be any computing device capable of initiating messages for processing by the message processing server 106 as described above and in more detail below. For example, the computing device 102 may include devices such as a personal computer (e.g., desktop, laptop, palm, etc.) or a handheld device (e.g., cellular telephone, personal digital assistant (PDA), email device, music recording or playback device, etc.), or any other device capable of processing information as described in more detail below.

The message processing server 106 and the web server 108 may be any server device suitable for use in association with the present subject matter. For example, the message processing server 106 and the web server 108 may each provide web content that may be accessed by the computing device 102. As such, the message processing server 106 and the web server 108 represent web servers and other content servers for purposes of the present description. Additionally, the message processing server 106 may provide proxy or other services for or on behalf of the web server 108. As such, the message processing server 106 may process messages received from the computing device 102 independently and/or may forward messages to the web server 108 for processing. In either situation, the message processing server 106 processes message content received in association with messages generated by the computing device 102, as described above and in more detail below.

It is further understood that the present subject matter is not limited to web-based applications and that it may be used for other asynchronous messaging implementations, such as programming language-based asynchronous implementations developed in languages such as Java. Accordingly, any such implementation is considered within the scope of the present subject matter.

The network 104 includes any form of interconnection suitable for the intended purpose, including a private or public network such as an intranet or the Internet, respectively, direct inter-module interconnection, dial-up, wireless, or any other interconnection mechanism capable of interconnecting the devices within the system 100.

Figure 2:
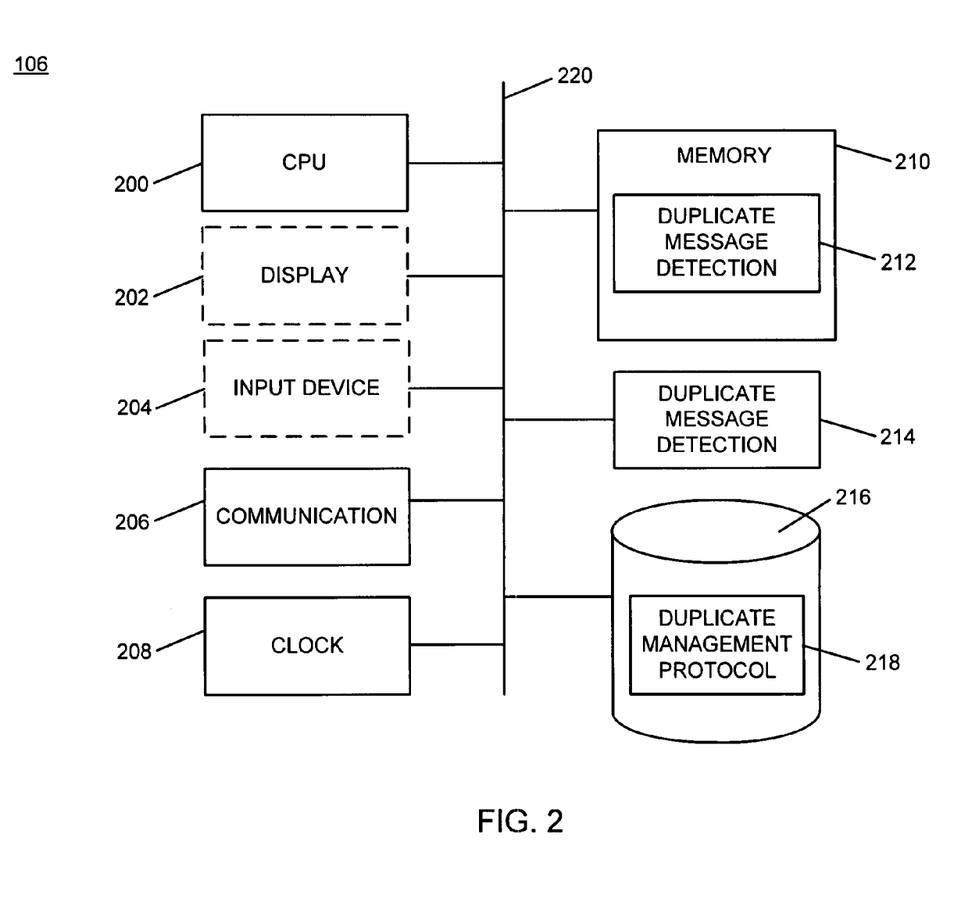
FIG. 2 is a block diagram of an example of an implementation of a message processing server that performs automated duplicate message content detection based upon storage of message content associated with messages received by the message processing server and comparison of the stored message content with message content associated with subsequent incoming messages according to an embodiment of the present subject matter.

FIG. 2 is a block diagram of an example of an implementation of the message processing server 106 that performs automated duplicate message content detection based upon storage of message content associated with messages received by the message processing server 106 and comparison of the stored message content with message content associated with subsequent incoming messages. A central processing unit (CPU) 200 provides computer instruction, execution, computation, and other capabilities within the message processing server 106. A display 202 provides visual information to a user of the message processing server 106 and an input device 204 provides input capabilities for the user.

The display 202 may include any display device, such as a cathode ray tube (CRT), liquid crystal display (LCD), light emitting diode (LED), projection, touchscreen, or other display element or panel. The input device 204 may include a computer keyboard, a keypad, a mouse, a pen, a joystick, or any other type of input device by which the user may interact with and respond to information on the display 202.

It should be noted that the display 202 and the input device 204 are illustrated with a dashed-line representation within FIG. 2 to indicate that they are optional components for the message processing server 106. Accordingly, the message processing server 106 may operate as a completely automated embedded device without user configurability or feedback. However, the message processing server 106 may also provide user feedback and configurability via the display 202 and the input device 204, respectively.

A communication module 206 provides interconnection capabilities that allow the message processing server 106 to communicate with other modules within the system 100, such as the computing device 102 and the web server 108, to perform activities associated with processing of message content. The communication module 206 may include any electrical, protocol, and protocol conversion capabilities useable to provide the interconnection capabilities. Though the communication module 206 is illustrated as a component-level module for ease of illustration and description purposes, it should be noted that the communication module 206 may include any hardware, programmed processor(s), and memory used to carry out the functions of the communication module 206 as described above and in more detail below. For example, the communication module 206 may include additional controller circuitry in the form of application specific integrated circuits (ASICs), processors, antennas, and/or discrete integrated circuits and components for performing communication and electrical control activities associated with the communication module 206. Additionally, the communication module 206 may include interrupt-level, stack-level, and application-level modules as appropriate. Furthermore, the communication module 206 may include any memory components used for storage, execution, and data processing for performing processing activities associated with the communication module 206. The communication module 206 may also form a portion of other circuitry described without departure from the scope of the present subject matter.

A clock 208 provides time keeping capabilities for the message processing server 106. The message processing server 106 may use the clock 208 to time stamp message content associated with the automated duplicate message content detection. Such processing may include activities associated with configuration and processing of expiration criteria, as described in more detail below.

A memory 210 includes a duplicate message detection storage area 212 that stores message content, time stamp information, and expiration configuration information associated with received message content. As will be described in more detail below, information stored within the duplicate message detection storage area 212 is used to process incoming messages to determine whether stored message content is duplicated by the message content associated with an incoming message.

A duplicate message detection module 214 is also illustrated. The duplicate message detection module 214 provides the automated duplicate message content detection for the message processing server 106 based upon stored message content, time stamp information, and expiration configuration information associated with stored message content. As will be described in more detail below, the duplicate message detection module 214 performs a duplicate message content management action based upon the determination as to whether the stored message content is duplicated by the message content associated with the incoming message.

Though the duplicate message detection module 214 is illustrated as a component-level module for ease of illustration and description purposes, it should be noted that the duplicate message detection module 214 may include any hardware, programmed processor(s), and memory used to carry out the functions of the duplicate message detection module 214 as described above and in more detail below. For example, the duplicate message detection module 214 may include additional controller circuitry in the form of application specific integrated circuits (ASICs), processors, antennas, and/or discrete integrated circuits and components for performing communication and electrical control activities associated with the duplicate message detection module 214. Additionally, the duplicate message detection module 214 may also include interrupt-level, stack-level, and application-level modules as appropriate. Furthermore, the duplicate message detection module 214 may include any memory components used for storage, execution, and data processing for performing processing activities associated with the duplicate message detection module 214. The duplicate message detection module 214 may also form a portion of other circuitry described without departure from the scope of the present subject matter.

A database 216 is associated with the message processing server 106 and provides storage capabilities for information associated with the automated duplicate message content detection. The database 216 includes a duplicate management protocol storage area 218 that may be stored in the form of tables or other arrangements accessible by the message processing server 106. The duplicate management protocol storage area 218 includes information, such as message content processing rules, useable to configure processing for detection of duplicate message content. As described above, these rules may include comparison of an entire item of message content, a portion of an item of message content, a specific data pattern within a portion of an item of message content, or any other suitable duplicate message content detection criteria. Continuing again with the XSLT example above, message content may be processed with a configured XSLT transformation that encodes the processing rules. The message content processing rules may be configured and stored within the duplicate management protocol storage area 218. The duplicate management protocol storage area 218 also includes information useable to configure expiration events for message content stored within the duplicate message detection storage area 212 of the memory 210. As will be described in more detail below, information stored within the duplicate management protocol storage area 218 is also used to configure, analyze, and process stored message content within the duplicate message detection storage area 212.

It is understood that the memory 210 may include any combination of volatile and non-volatile memory suitable for the intended purpose, distributed or localized as appropriate, and may include other memory segments not illustrated within the present example for ease of illustration purposes. For example, the memory 210 may include a code storage area, a code execution area, and a data area without departure from the scope of the present subject matter.

The CPU 200, the display 202, the input device 204, the communication module 206, the clock 208, the memory 210, the duplicate message detection module 214, and the database 216 are interconnected via an interconnection 220. The interconnection 220 may include a system bus, a network, or any other interconnection capable of providing the respective components with suitable interconnection for the respective purpose.

While the message processing server 106 is illustrated with and has certain components described, other modules and components may be associated with the message processing server 106 without departure from the scope of the present subject matter. Additionally, it should be noted that, while the message processing server 106 is described as a single device for ease of illustration purposes, the components within the message processing server 106 may be co-located or distributed and interconnected via a network without departure from the scope of the present subject matter. For a distributed arrangement, the display 202 and the input device 204 may be located at a point of sale device, kiosk, or other location, while the CPU 200 and memory 210 may be located at a local or remote server. Many other possible arrangements for components of the message processing server 106 are possible and all are considered within the scope of the present subject matter. It should also be understood that, though the duplicate management protocol storage area 218 is shown within the database 216, it may also be stored within the memory 210 without departure from the scope of the present subject matter. Accordingly, the message processing server 106 may take many forms and may be associated with many platforms.

Figure 3:
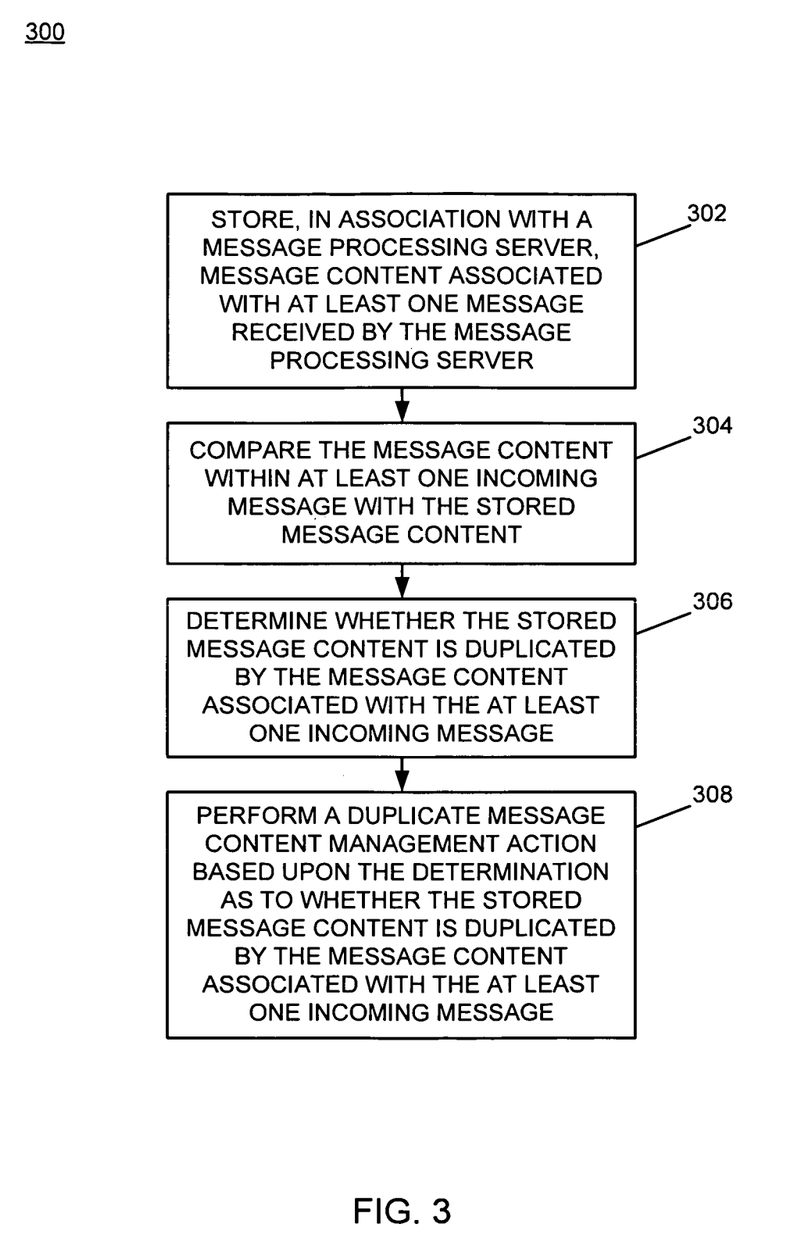
FIG. 3 is a flow chart of an example of an implementation of a process that provides automated duplicate message content detection at a server device, such as a message processing server, according to an embodiment of the present subject matter.
Figure 4:
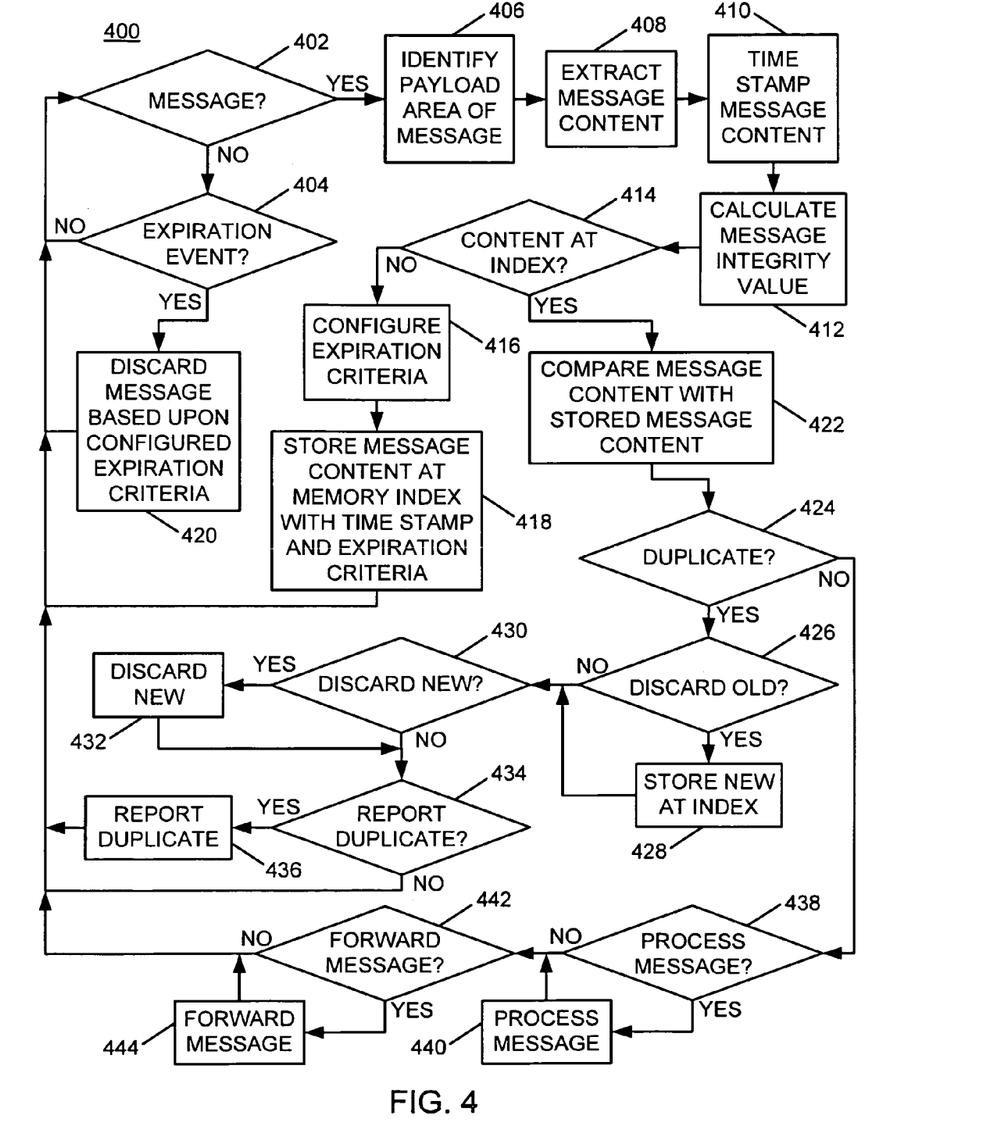
FIG. 4 is a flow chart of an example of an implementation of a process executable by a message processing server to provide automated duplicate message content detection by time stamping stored message content, configuring expiration criteria for stored message content, and performing duplicate message detection processing according to an embodiment of the present subject matter.

FIG. 3 and FIG. 4 below describe example processes that may be executed by server devices, such as the message processing server 106, to perform the automated duplicate message content detection associated with the present subject matter. Many other variations on the examples processes are possible and all are considered within the scope of the present subject matter. The example processes may be performed by modules, such as the duplicate message detection module 214 and/or executed by the CPU 200, associated with server devices. It should be noted that time out procedures and other error control procedures are not illustrated within the example processes described below for ease of illustration purposes. However, it is understood that all such procedures are considered to be within the scope of the present subject matter.

FIG. 3 is a flow chart of an example of an implementation of a process 300 that provides automated duplicate message content detection at a server device, such as the message processing server 106. At block 302, the process 300 stores, in association with a message processing server, message content associated with at least one message received by the message processing server in the memory. At block 304, the process 300 compares the message content within at least one incoming message with the stored message content. At block 306, the process 300 determines whether the stored message content is duplicated by the message content associated with the at least one incoming message. At block 308, the process 300 performs a duplicate message content management action based upon the determination as to whether the stored message content is duplicated by the message content associated with the at least one incoming message.

FIG. 4 is a flow chart of an example of an implementation of a process 400 executable by a message processing server, such as the message processing server 106, to provide automated duplicate message content detection by time stamping stored message content, configuring expiration criteria for stored message content, and performing duplicate message detection processing. At decision point 402, the process 400 makes a determination as to whether a message has been received. When a determination is made that a message has not yet been received, the process 400 makes a determination at decision point 404 as to whether a configured expiration event for any stored message content has occurred. As will be described in more detail below, message content associated with messages received by the message processing server 106 is stored and expiration events may be configured to define when a particular item of stored message content is discarded or overwritten within the respective storage location. The processing at decision point 404 may include any form of processing, such as checking a configured expiration flag, associated with each item of stored message content. The processing at decision point 404 may also include interrupt-based or other processing, as appropriate for a given implementation, to initiate expiration event processing for stored message content.

When a determination is made that a configured expiration event for any stored message content has not occurred, the process 400 returns to decision point 402 to determine whether a message has been received. The process 400 iterates between decision point 402 and decision point 404 until either a message has been received or a configured expiration event for any stored message content has occurred. Further description of processing associated with decision point 404 will be discussed below following a description of message processing associated with receipt of a message, as determined by decision point 402.

When a determination is made at decision point 402 that a message has been received, the process 400 identifies a message content payload area associated with the received message at block 406. It should be understood that the process 400 may receive multiple messages over time. As such, subsequent incoming messages may be processed similarly to the processing associated with the first received message.

Additionally, as described above, the message content may include a portion of a set of data and a portion of a document. Data may be text data, tabular data, indexed data, or may be other data with any type of organization. A document may be a text document, a formatted text document (e.g., a word processing document), an XML document, an XSLT document, or any other form of document. For an XML document or an XSLT document, identifying the message content payload area within a received message may be performed via a pointer to the data portion within the message. Continuing with the XSLT example above, a message with an XML message body may be transformed by a receiving device using XSLT encoded with rules for transforming the XML document. Many other possibilities exist for selecting a format for message content and for identifying message content for duplicate message content detection and all are considered within the scope of the present subject matter.

At block 408, the process 400 extracts message content from the received message, such as from the identified message content payload area or by access to the document-based message content via the pointer. At block 410, the process 400 time stamps the message content associated with the received message with an arrival time. The arrival time may be determined, for example, via the clock 208 described above. The time stamp associated with a particular item of message content may be represented by a time value that is stored in association with the item of message content. This time value may be utilized in subsequent expiration event processing, as described in more detail below.

At block 412, the process 400 calculates a message content integrity value based upon the message content associated with the received message. The message content integrity value may include a value, such as a checksum value, a cyclical redundancy check (CRC) value, or any other suitable message content integrity value. As described above, message content may be stored within a memory at an index referenced by a message content integrity value to allow rapid storage of incoming content at a reference location that is associated with the actual message content. As such, message content received in subsequent messages may yield an identical message content integrity value given the same processing for deriving the message content integrity value for the original message content and for any subsequent messages. As will be described in more detail below, the message processing server 106 uses the message content integrity value for indexed storage of message content to identify the same message content received in multiple messages via reference to storage locations in memory and comparison of message content stored at the respective locations with the message content received. This approach provides a compact duplicate message processing capability for the message processing server 106. Other variations on this example are possible along with other approaches to identifying duplicated message content and all are considered within the scope of the present subject matter.

At decision point 414, the process 400 makes a determination as to whether there is message content presently stored at the memory location referenced by the calculated message content integrity value index, such as within the duplicate message detection storage area 212 of the memory 210. The process 400 uses the calculated message content integrity value as an index reference to a location within the memory 210 to determine whether there is any message content stored at the referenced index. There are many possible ways to determine whether message content is stored at a given location of memory. For example, a default value (e.g., 0xFF) may be stored at a location that does not contain message content. Alternatively, a flag may be associated with each memory location to indicate whether message content is stored at any given location. Many other variations are possible for determining whether there is message content presently stored at the memory location referenced by the calculated message content integrity value index and all are considered within the scope of the present subject matter.

When a determination is made at decision point 414 that there is no message content presently stored at the memory location referenced by the calculated message content integrity value index, the process 400 configures expiration criteria for the received message content at block 416. As described above, expiration criteria may be configured and used to trigger expiration events for storage of the message content. As such, the message content may be discarded based upon the configured expiration criteria. Discarding may include deleting message content from a given memory location, reinitializing the memory location to a default value, clearing a flag associated with the memory location, or any other suitable approach.

Examples of expiration criteria that may be configured include expiration of a fixed storage time, arrival of a fixed number of intervening messages, expiration of a message inter-arrival time longer than a configured message inter-arrival storage interval, stored message content in excess of a configured storage capacity limitation threshold, expiration of a configured message duplication protection duration, a least recently matched (LRM) message content storage strategy, and upon a determination that stored message content is duplicated by received message content. Many other examples of expiration criteria are possible and all are considered within the scope of the present subject matter.

To elaborate on a few of the examples given above, expiration of a fixed storage time may be based upon a time reading from the clock 208 in comparison with a time stamp associated with an item of stored message content. Similarly, arrival of a fixed number of intervening messages may be based upon a message count maintained by a module, such as the duplicate message detection module 214. The arrival of a fixed number of intervening messages may also be based upon network traffic, bandwidth, or any other factor that allows for storage of message content for a duration suitable for the intended purpose.

Expiration of a message inter-arrival time longer than a configured message inter-arrival storage interval may be based upon readings from the clock 208 as compared with the time stamp associated with stored message content and the configured message inter-arrival storage interval may be based upon a message count maintained by a module, such as the duplicate message detection module 214. The expiration of a message inter-arrival time longer than a configured message inter-arrival storage interval may also be based upon network traffic, bandwidth, or any other suitable measure for the intended purpose.

Available storage capacity may also be used such that storage of message content in excess of a configured storage capacity limitation threshold may be used to configure expiration events for storage of message content. The configured storage capacity limitation threshold may be established at a storage level with respect to the available storage suitable to ensure that storage is available for incoming message content. This threshold may also be based upon network traffic, bandwidth, or any other factors suitable for the intended purpose and may include an absolute storage threshold, a percentage of available memory, or any other suitable threshold definition.

A message duplication protection duration may also be established to define a duration for protection associated with any received message content. The message duplication protection duration may also be based upon network traffic, bandwidth, or another suitable factor. It is additionally noted that a message duplication protection duration may be established based upon a type of system within which the present subject matter is implemented. For example, in the example of the user interface associated with the web browser, a message duplication protection duration may be established relative to a typical response time for a web content server or a typical time beyond which a user may become impatient and initiate a user interface action that causes the web browser to resend a content request message from a device, such as the computing device 102. Many other examples of message duplication protection duration configuration are possible and all are considered within the scope of the present subject matter.

A least recently matched (LRM) message content storage strategy may also be established so that stored message content may be discarded based upon discarding of the oldest message content that has not been matched by incoming messages. Additionally, for diagnostic or other purposes, message content may be discarded based upon a determination that the stored message content is duplicated by message content associated with an incoming message. As will be described in more detail below, reports may be generated for this or many other situations associated with the present subject matter.

At block 418, the process 400 stores the message content at a memory index referenced by the calculated message content integrity value along with the time stamp and any configured expiration criteria for the message content. The process 400 returns to decision point 402 to make a determination as to whether another message has been received. The process 400 continues to iterate between decision point 402 and decision point 404 as described above. When a determination is made at decision point 404 that an expiration event associated with stored message content has expired, the process 400 discards the message content based upon the configured expiration criteria at block 420. The expiration event and the discarding of message content based upon the configured expiration criteria and may include any of the configured expiration criteria and discarding strategies described above or any other expiration criteria or discarding strategy suitable for the given implementation. The process 400 returns to decision point 402 and continues to iterate as described above.

The process 400 iterates as described above for each received message until receipt of an incoming message and calculation of an associated message content integrity value for a given incoming message results in a determination at decision point 414 that content is stored at the associated memory index referenced by the message content integrity value. When a determination is made that content is stored at the associated memory index, the process 400 compares message content identified within the payload area of the incoming message with the message content stored at the respective index at block 422.

At decision point 424, the process 400 makes a determination as to whether the stored message content has been duplicated within the incoming message. The determination at decision point 424 may be based upon the entire message content, a portion of the message content, or any other suitable measure. The determination may also be based upon a specific data pattern associated with the message content for diagnostic or other purposes. For example, a determination may be made as to whether a specific data pattern is present within the stored message content and the message content associated with the incoming message. In this way, specific data patterns may be identified as duplicated within a system, such as the system 100. Continuing with the XSLT example above, rules may be constructed to manipulate message content upon extraction of the message content from an incoming message. In such a situation, a repeating pattern may be identified by a comparison rule encoded within the XSLT and the process 400 may perform such processing for message content encoded within an XML format.

When a determination is made that the message content is duplicated within the incoming message relative to the stored message content at decision point 424, the process 400 performs a duplicate message content management action. The duplicate message content management action may be based upon configured duplicate message content management criteria, such as a duplicate message content management protocol or any other suitable duplicate message content processing. A duplicate message content management protocol or criteria may be stored, for example, within the duplicate management protocol storage area 218. The process 400, as described below, includes certain examples of possible duplicate message content management actions. However, it is understood that many other duplicate message content management actions are possible, and all are considered within the scope of the present subject matter.

As such, as part of the example duplicate message content management action processing, the process 400 makes a determination at decision point 426 as to whether to discard the stored message content (e.g., the older message content).

When a determination is made to discard the stored message content, the process 400 stores the new incoming message content at the memory index referenced by the calculated message content integrity value at block 428. Upon storing the new incoming message content or upon determining not to discard the stored message content, the process 400 makes a determination at decision point 430 as to whether to discard the new incoming message content. When a determination is made to discard the new incoming message content, the process 400 discards the new incoming message content at block 432. Upon discarding the new incoming message content or upon determining not to discard the new incoming message content, the process 400 makes a determination at decision point 434 as to whether to generate a duplicate message content report. The duplicate message content report may be generated and sent to a device monitored or controlled by a system administrator, report message logging system, or any other suitable message reporting device or system. Upon determining to report the duplicate message content, the process 400 reports the duplicate message content to the selected destination at block 436. Upon reporting the duplicate message content or upon determining not to report the duplicate message content, the process 400 returns to decision point 402 to iterate between decision point 402 and decision point 404 as described above.

Returning to the description of decision point 424, when the process 400 makes the determination that the content is not duplicated, the process 400 performs certain message content processing activities associated with the incoming message. It should be noted that additional processing in addition to that described below may be performed, but is not represented within FIG. 4 for ease of illustration purposes. For example, for a system that implements a checksum-based message content integrity value, multiple items of message content may result in the same checksum value, and thereby the same memory index. The process 400 may be modified to manage this situation by separately storing both items of memory content within the memory, such as via an offset from the calculated message content integrity value. As such, the process 400 may be modified to manage multiple message content items having the same message content integrity value without departure from the scope of the present subject matter.

Returning to the description of FIG. 4, at decision point 438, the process 400 makes a determination as to whether to process the incoming message locally. When a determination is made to process the message locally, the process 400 processes the message content at block 440. Upon processing the message content or upon determining not to process the message content locally, the process 400 makes a determination at decision point 442 as to whether to forward the message content to another device, such as the web server 108. When a determination is made to forward the message to another device, the process 400 forwards the message to the other device at block 444. Upon forwarding the message to the other device or upon determining not to forward the message, the process 400 returns to decision point 402 to iterate as described above. It should be noted that the processing described above in association with decision point 438 and decision point 442 may be performed for any received message and the process 400 may be modified to accommodate this processing without departure from the scope of the present subject matter.

As described above in association with FIGS. 1 through 4, the example systems and processes provide automated duplicate message content detection. Many other variations and additional activities associated with automated duplicate message content detection are possible and all are considered within the scope of the present subject matter.

Those skilled in the art will recognize, upon consideration of the above teachings, that certain of the above examples are based upon use of a programmed processor such as the CPU 200. However, the invention is not limited to such exemplary embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable storage medium(s) may be utilized. The computer-usable or computer-readable storage medium may be, for example but not limited to, an electronic, magnetic, optical, electromagnetic, infrared, or semiconductor system, apparatus, or device medium. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, or a magnetic storage device. Note that the computer-usable or computer-readable storage medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable storage medium may be any medium that can contain, store, communicate, or transport the program for use by or in connection with the instruction execution system, apparatus, or device.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention has been described with reference to flowchart illustrations and/or block diagrams of methods, apparatus (systems) and computer program products according to example embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable storage medium that can direct a computer or other programmable data processing apparatus to function in a particular manner, such that the instructions stored in the computer-readable storage medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible example implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Those skilled in the art will recognize improvements and modifications to the preferred embodiments of the present invention. All such improvements and modifications are considered within the scope of the concepts disclosed herein and the claims that follow.

What is claimed is:

1. A method, comprising:
    storing, in association with a message processing server, original application-layer message content associated with at least one message received by the message processing server;
    comparing incoming original application-layer message content within at least one incoming message with the stored original application-layer message content;
    determining whether the stored original application-layer message content is duplicated by the incoming original application-layer message content associated with the at least one incoming message; and performing a duplicate message content management action based upon the determination as to whether the stored original application-layer message content is duplicated by the incoming original application-layer message content associated with the at least one incoming message;
    where storing, in association with the message processing server, the original application-layer message content associated with the at least one received message comprises:
        calculating a message content integrity value comprising at least one of a checksum value and a cyclical redundancy check (CRC) value based upon the original application-layer message content associated with the at least one received message; and
        storing the original application-layer message content associated with the at least one received message in a memory at a location referenced by the message content integrity value; and
    where storing, in association with the message processing server, the original application-layer message content associated with the at least one received message comprises time stamping the original application-layer message content associated with the at least one received message with an arrival time and further comprising:
        storing the arrival time with the original application-layer message content associated with the at least one received message; and
        discarding the stored original application-layer message content upon expiration of a configured expiration event for storage of message content.

2. The method of claim 1, where determining whether the stored original application-layer message content is duplicated by the incoming original application-layer message content associated with the at least one incoming message comprises determining whether a specific data pattern is present within the stored original application-layer message content and the incoming original application-layer message content associated with the at least one incoming message.

3. The method of claim 1, where performing the duplicate message content management action based upon the determination as to whether the stored original application-layer message content is duplicated by the incoming original application-layer message content associated with the at least one incoming message comprises at least one of:
in response to a determination that the at least one incoming message comprises duplicated message content, at least one of:
discarding at least one of the at least one incoming message and the stored original application-layer message content; and
reporting that the stored original application-layer message content is duplicated by the incoming original application-layer message content associated with the at least one incoming message; and
in response to a determination that the at least one incoming message does not comprise duplicated message content, at least one of:
processing the incoming original application-layer message content within the at least one incoming message; and
forwarding the at least one incoming message to another device.

4. The method of claim 1, where discarding the stored original application-layer message content upon expiration of the configured expiration event for the storage of message content comprises at least one of:
discarding the stored original application-layer message content upon expiration of a fixed storage time;
discarding the stored original application-layer message content upon arrival of a fixed number of intervening messages;
discarding the stored original application-layer message content upon expiration of a message inter-arrival time longer than a configured message inter-arrival storage interval;
discarding the stored original application-layer message content upon storage of message content in excess of a configured storage capacity limitation threshold;
discarding the stored original application-layer message content upon expiration of a configured message duplication protection duration;
discarding the stored original application-layer message content based upon a least recently matched (LRM) message content storage strategy; and
discarding the stored original application-layer message content based upon a determination that the stored original application-layer message content is duplicated by the incoming original application-layer message content associated with the at least one incoming message.

5. The method of claim 1, where comparing the incoming original application-layer message content within the at least one incoming message with the stored original application-layer message content comprises:
identifying an application-layer message content payload area associated with the at least one incoming message; and
comparing data within the application-layer message content payload area associated with the at least one incoming message with the stored original application-layer message content.

6. The method of claim 1, where the incoming original application-layer message content within the at least one incoming message comprises at least one portion of an extensible markup language (XML) document and where comparing the incoming original application-layer message content within the at least one incoming message with the stored original application-layer message content comprises processing the at least one portion of the XML document using an extensible stylesheet language transformation (XSLT) and identifying a data portion within the document using a result of the XSLT processing.

7. A computer program product comprising a computer-readable storage device including a computer readable program, where the computer readable program when executed on a computer causes the computer to:
store, in association with a message processing server, original application-layer message content associated with at least one message received by the message processing server in a memory;
compare incoming original application-layer message content within at least one incoming message with the stored original application-layer message content;
determine whether the stored original application-layer message content is duplicated by the incoming original application-layer message content associated with the at least one incoming message; and
perform a duplicate message content management action based upon the determination as to whether the stored original application-layer message content is duplicated by the incoming original application-layer message content associated with the at least one incoming message;
where, in causing the computer to store, in association with the message processing server, the original application-layer message content associated with the at least one received message, the computer readable program when executed on the computer causes the computer to:
calculate a message content integrity value comprising at least one of a checksum value and a cyclical redundancy check (CRC) value based upon the original application-layer message content associated with the at least one received message; and
store the original application-layer message content associated with the at least one received message in the memory at a location referenced by the message content integrity value;
where, in causing the computer to store, in association with the message processing server, the original application-layer message content associated with the at least one received message, the computer readable program when executed on the computer causes the computer to time stamp the original application-layer message content associated with the at least one received message with an arrival time; and
where the computer readable program when executed on the computer further causes the computer to:
store the arrival time with the original application-layer message content associated with the at least one received message in the memory; and
discard the stored original application-layer message content upon expiration of a configured expiration event for storage of message content.

8. The computer program product of claim 7, where, in causing the computer to discard the stored original application-layer message content upon expiration of the configured expiration event for the storage of message content, the computer readable program when executed on the computer causes the computer to at least one of:
discard the stored original application-layer message content upon expiration of a fixed storage time;
discard the stored original application-layer message content upon arrival of a fixed number of intervening messages;

discard the stored original application-layer message content upon expiration of a message inter-arrival time longer than a configured message inter-arrival storage interval;

discard the stored original application-layer message content upon storage of message content in excess of a configured storage capacity limitation threshold;

discard the stored original application-layer message content upon expiration of a configured message duplication protection duration;

discard the stored original application-layer message content based upon a least recently matched (LRM) message content storage strategy; and discard the stored original application-layer message content based upon a determination that the stored original application-layer message content is duplicated by the incoming original application-layer message content associated with the at least one incoming message.

9. The computer program product of claim 7, where, in causing the computer to compare the incoming original application-layer message content within the at least one incoming message with the stored original application-layer message content, the computer readable program when executed on the computer causes the computer to:

identify an application-layer message content payload area associated with the at least one incoming message; and compare data within the application-layer message content payload area associated with the at least one incoming message with the stored original application-layer message content.

10. The computer program product of claim 7, where the incoming original application-layer message content within the at least one incoming message comprises at least one portion of an extensible markup language (XML) document and where, in causing the computer to compare the incoming original application-layer message content within the at least one incoming message with the stored original application-layer message content, the computer readable program when executed on the computer causes the computer to process the at least one portion of the XML document using an extensible stylesheet language transformation (XSLT) and to identify a data portion within the document using a result of the XSLT processing.

11. The computer program product of claim 7, where, in causing the computer to determine whether the stored original application-layer message content is duplicated by the incoming original application-layer message content associated with the at least one incoming message, the computer readable program when executed on the computer causes the computer to determine whether a specific data pattern is present within the stored original application-layer message content and the incoming original application-layer message content associated with the at least one incoming message.

12. The computer program product of claim 7, where, in causing the computer to perform the duplicate message content management action based upon the determination as to whether the stored original application-layer message content is duplicated by the incoming original application-layer message content associated with the at least one incoming message, the computer readable program when executed on the computer causes the computer to at least one of:

in response to a determination that the at least one incoming message comprises duplicated message content, at least one of:

discard at least one of the at least one incoming message and the stored original application-layer message content; and report that the stored original application-layer message content is duplicated by the incoming original application-layer message content associated with the at least one incoming message; and in response to a determination that the at least one incoming message does not comprise duplicated message content, at least one of:

process the incoming original application-layer message content within the at least one incoming message; and forward the at least one incoming message to another device.

13. A system, comprising:

a memory; and a processor programmed to:

store, in association with a message processing server, original application-layer message content associated with at least one message received by the message processing server in the memory;

compare incoming original application-layer message content within at least one incoming message with the stored original application-layer message content;

determine whether the stored original application-layer message content is duplicated by the incoming original application-layer message content associated with the at least one incoming message; and perform a duplicate message content management action based upon the determination as to whether the stored original application-layer message content is duplicated by the incoming original application-layer message content associated with the at least one incoming message;

where, in being programmed to store, in association with the message processing server, the original application-layer message content associated with the at least one message received by the message processing server in the memory, the processor is programmed to:

calculate a message content integrity value comprising at least one of a checksum value and a cyclical redundancy check (CRC) value based upon the original application-layer message content associated with the at least one received message; and store the original application-layer message content associated with the at least one received message in the memory at a location referenced by the message content integrity value; and where, in being programmed to store, in association with the message processing server, the original application-layer message content associated with the at least one message received by the message processing server in the memory, the processor is programmed to time stamp the original application-layer message content associated with the at least one received message with an arrival time; and where the processor is further programmed to:

store the arrival time with the original application-layer message content associated with the at least one received message in the memory; and discard the stored original application-layer message content upon expiration of a configured expiration event for storage of message content.

14. The system of claim 13, where the incoming original application-layer message content within the at least one incoming message comprises at least one portion of an extensible markup language (XML) document and where, in being programmed to compare the incoming original application-layer message content within the at least one incoming message with the stored original application-layer message content, the processor is programmed to process the at least one portion of the XML document using an extensible stylesheet language transformation (XSLT) and to identify a data portion within the document using a result of the XSLT processing.

15. The system of claim 13, where, in being programmed to determine whether the stored original application-layer message content is duplicated by the incoming original application-layer message content associated with the at least one incoming message, the processor is programmed to determine whether a specific data pattern is present within the stored original application-layer message content and the incoming original application-layer message content associated with the at least one incoming message.

16. The system of claim 13, where, in being programmed to perform the duplicate message content management action based upon the determination as to whether the stored original application-layer message content is duplicated by the incoming original application-layer message content associated with the at least one incoming message, the processor is programmed to at least one of:
  in response to a determination that the at least one incoming message comprises duplicated message content, at least one of:
    discard at least one of the at least one incoming message and the stored original application-layer message content; and
    report that the stored original application-layer message content is duplicated by the incoming original application-layer message content associated with the at least one incoming message; and
  in response to a determination that the at least one incoming message does not comprise duplicated message content, at least one of:
    process the incoming original application-layer message content within the at least one incoming message; and
    forward the at least one incoming message to another device.

17. The system of claim 13, where, in being programmed to discard the stored original application-layer message content upon expiration of the configured expiration event for the storage of message content, the processor is programmed to at least one of:
  discard the stored original application-layer message content upon expiration of a fixed storage time;
  discard the stored original application-layer message content upon arrival of a fixed number of intervening messages;
  discard the stored original application-layer message content upon expiration of a message inter-arrival time longer than a configured message inter-arrival storage interval;
  discard the stored original application-layer message content upon storage of message content in excess of a configured storage capacity limitation threshold;
  discard the stored original application-layer message content upon expiration of a configured message duplication protection duration;
  discard the stored original application-layer message content based upon a least recently matched (LRM) message content storage strategy; and
  discard the stored original application-layer message content based upon a determination that the stored original application-layer message content is duplicated by the message content associated with the at least one incoming message.

18. The system of claim 13, where, in being programmed to compare the incoming original application-layer message content within the at least one incoming message with the stored original application-layer message content, the processor is programmed to:
  identify an application-layer message content payload area associated with the at least one incoming message; and
  compare data within the application-layer message content payload area associated with the at least one incoming message with the stored original application-layer message content.

19. A system, comprising:
a memory; and
a processor programmed to:
  calculate a message content integrity value comprising at least one of a checksum value and a cyclical redundancy check (CRC) value based upon original application-layer message content associated with at least one message received by a message processing server;
  time stamp the original application-layer message content associated with the at least one received message with an arrival time;
  store the arrival time with the original application-layer message content associated with the at least one received message in the memory at a location referenced by the message content integrity value;
  identify an application-layer message content payload area associated with at least one incoming message;
  compare application-layer message content within the application-layer message content payload area associated with the at least one incoming message with the stored original application-layer message content;
  determine whether a specific data pattern associated with the stored original application-layer message content is duplicated by the application-layer message content within the application-layer message content payload area associated with the at least one incoming message;
  in response to a determination that the at least one incoming message comprises duplicated application-layer message content, at least one of:
    discard at least one of the at least one incoming message and the stored original application-layer message content; and
    report that the stored original application-layer message content is duplicated by the application-layer message content within the application-layer message content payload area associated with the at least one incoming message; and
  in response to a determination that the at least one incoming message does not comprise duplicated application-layer message content, at least one of:
    process the application-layer message content within the application-layer message content payload area associated with the at least one incoming message; and
    forward the at least one incoming message to another device; and
  discard the stored original application-layer message content upon expiration of a configured expiration event for storage of message content if the stored original application-layer message content has not been discarded in response to the determination that the at least one incoming message comprises duplicated application-layer message content.

\* \* \* \* \*